United States Patent
Stojkovic et al.

(10) Patent No.: US 12,043,797 B2
(45) Date of Patent: Jul. 23, 2024

(54) HIGH-FLOW POLYOLEFIN COATED MINERAL AS PROPPANT PARTICULATE MATERIAL AND METHODS RELATED THERETO

(71) Applicant: ExxonMobil Technology and Engineering Company, Spring, TX (US)

(72) Inventors: Dragan Stojkovic, Spring, TX (US); Abdelhadi Sahnoune, Houston, TX (US); Haiqing Peng, Sugar Land, TX (US); Lee J. Hall, The Woodlands, TX (US); Kendal K. Decker, Spring, TX (US)

(73) Assignee: ExxonMobil Technology and Engineering Company, Spring, TX (US)

(*) Notice: Subject to any disclaimer, the term of this patent is extended or adjusted under 35 U.S.C. 154(b) by 0 days.

(21) Appl. No.: 18/054,345

(22) Filed: Nov. 10, 2022

(65) Prior Publication Data

US 2023/0167354 A1 Jun. 1, 2023

Related U.S. Application Data

(60) Provisional application No. 63/264,729, filed on Dec. 1, 2021.

(51) Int. Cl.
  *C09K 8/80* (2006.01)
  *C09K 8/68* (2006.01)
  *E21B 43/267* (2006.01)

(52) U.S. Cl.
  CPC .............. *C09K 8/805* (2013.01); *C09K 8/685* (2013.01); *E21B 43/267* (2013.01)

(58) Field of Classification Search
  None
  See application file for complete search history.

(56) References Cited

U.S. PATENT DOCUMENTS

| 2006/0035790 A1 | 2/2006 | Okell et al. |
| 2006/0100342 A1 | 5/2006 | Jensen |
| 2007/0023187 A1 | 2/2007 | Canova et al. |
| 2007/0166541 A1* | 7/2007 | Smith ................ C04B 35/10 428/407 |
| 2007/0169935 A1* | 7/2007 | Akbar ................ E21B 33/138 166/284 |
| 2014/0110110 A1* | 4/2014 | Rohring ................ C09K 8/80 166/280.2 |
| 2016/0326351 A1* | 11/2016 | Yalcin ............. C08L 23/0815 |
| 2016/0333689 A1* | 11/2016 | Eick ...................... G01V 3/26 |

FOREIGN PATENT DOCUMENTS

| EP | 2074178 B1 | 12/2011 |
| WO | 2020142232 A1 | 7/2020 |

* cited by examiner

*Primary Examiner* — Andrew Sue-Ako
(74) *Attorney, Agent, or Firm* — ExxonMobil Technology and Engineering Company—Law Department

(57) ABSTRACT

Proppant particulates like sand are commonly used in hydraulic fracturing operations to maintain one or more fractures in an opened state following the release of hydraulic pressure. Fracturing fluids and methods of hydraulic fracturing may also use proppant particulates composed of high-flow polyolefin coated mineral particles (referred to as high-flow polyolefin coated mineral proppant particulates). In some instances, the high-flow polyolefin-coated mineral proppant particulates have a particle density of equal to or less than about 1.35 grams per cubic centimeter, and further may be prepared using a one-pot hot melt process.

23 Claims, No Drawings

HIGH-FLOW POLYOLEFIN COATED MINERAL AS PROPPANT PARTICULATE MATERIAL AND METHODS RELATED THERETO

CROSS-REFERENCE TO RELATED APPLICATION

This application claims the benefit of U.S. Provisional Application Ser. No. 63/264,729, entitled "High-Flow Polyolefin Coated Mineral as Proppant Particulate Material and Methods Related Thereto," filed Dec. 1, 2021, the disclosure of which is hereby incorporated by reference in its entirety.

FIELD OF INVENTION

This application relates to fracturing operations, and, in particular, to high-flow polyolefin coated mineral proppant particulates, and methods related thereto.

BACKGROUND OF THE INVENTION

A wellbore may be drilled into a subterranean formation in order to promote removal (production) of a hydrocarbon or water resource therefrom. In many cases, the subterranean formation needs to be stimulated in some manner in order to promote removal of the resource. Stimulation operations may include any operation performed upon the matrix of a subterranean formation in order to improve fluid conductivity therethrough, including hydraulic fracturing, which is a common stimulation operation for unconventional reservoirs (e.g., shale or loose sandstone).

Hydraulic fracturing operations pump large quantities of fluid into a subterranean formation (e.g., a low-permeability formation) under high hydraulic pressure to promote formation of one or more fractures within the matrix of the subterranean formation and create high-conductivity flow paths. Primary fractures extending from the wellbore and, in some instances, secondary fractures extending from the primary fractures, possibly dendritically, may be formed during a fracturing operation. These fractures may be vertical, horizontal, or a combination of directions forming a tortuous path.

Proppant particulates are often included in a fracturing fluid in order to keep the fractures open after the hydraulic pressure has been released following a hydraulic fracturing operation. Upon reaching the fractures, the proppant particulates settle therein to form a proppant pack to prevent the fractures from closing once the hydraulic pressure has been released. Accordingly, increasing the propped area within hydraulically induced fractures is a key factor for enhancing resource production.

There are oftentimes difficulties encountered during hydraulic fracturing operations, particularly associated with deposition of proppant particulates in fractures that have been created or extended under hydraulic pressure. Because proppant particulates are often fairly dense materials, effective transport of the proppant particulates may be difficult due to settling, making it challenging to distribute the proppant particulates into more remote reaches of a network of fractures. In addition, fine-grained particles (referred to as "fines") produced from the crushing of proppant particulates within the fractures can also lessen fluid conductivity, which may decrease production rates and/or necessitate wellbore cleanout operations.

SUMMARY OF INVENTION

This application relates to fracturing operations, and, in particular, to high-flow polyolefin coated mineral proppant particulates, and methods related thereto.

In nonlimiting aspects of the present disclosure, a proppant particulate is provided comprising a mineral particle; and a high-flow polyolefin coating at least a portion of the mineral particle, wherein the proppant particulate has a particle density of equal to or less than about 1.35 grams per cubic centimeter.

In nonlimiting aspects of the present disclosure, a fracturing fluid comprising a carrier fluid; and proppant particulates comprising a mineral particle and a high-flow polyolefin coating at least a portion of the mineral particle, wherein the proppant particulates have a particle density of equal to or less than about 1.35 grams per cubic centimeter.

In nonlimiting aspects of the present disclosure, a method is provided comprising introducing a fracturing fluid into a subterranean formation. The fracturing fluid comprises a carrier fluid; and proppant particulates comprising a mineral particle and a high-flow polyolefin coating at least a portion of the mineral particle, wherein the proppant particulates have a particle density of equal to or less than about 1.35 grams per cubic centimeter.

These and other features and attributes of the disclosed high-flow polyolefin coated mineral proppant particulates of the present disclosure and their advantageous applications and/or uses will be apparent from the detailed description which follows.

DETAILED DESCRIPTION OF THE INVENTION

This application relates to fracturing operations, and, in particular, to high-flow polyolefin coated mineral proppant particulates, and methods related thereto.

As discussed above, proppant particulates can be used effectively during fracturing operations, but there may be issues associated with their use. First, the high densities of typical proppant particulates may hinder their transport, possibly leading to inadequate proppant particulate disposition within one or a plurality of fractures. Second, some proppant particulates are prone to fines formation due to low crush strength values, which may lead to decreased fracture conductivity due to fines accumulation within a wellbore.

One way to produce a larger propped area is to use lighter proppant that will stay suspended in slickwater longer and will propagate further into the fracture. Ultralight proppant, with density very close to the density of slickwater, a low viscosity fluid, will stay suspended therein much longer compared to higher density traditional (e.g., sand) proppant particulates, and with slight variations in density it might settle both toward the bottom of the fracture. However, lighter density materials usually have less compressive strength to sustain the fracture opening permanently after fracture closure. Available ultra-light proppant options are either much more expensive than traditional proppant particulates, or have a comparably significantly lower compressive strength and hydraulic conductivities, which may settle toward the top of a fracture.

The present disclosure alleviates the foregoing difficulties and provides related advantages as well. In particular, the present disclosure provides low-density proppant particulates composed of a high-flow polyolefin coated mineral. The high-flow polyolefin coating surprisingly imparts a reduction in density to the otherwise uncoated sand particulates, for example, and thus can be effectively suspended in low viscosity carrier fluids and delivered at a high flow rate into a wellbore for hydraulic fracturing without a reduction in compressive strength, thereby addressing two shortcomings of traditional higher density or available lighter density proppant particulates. While coated proppant particulates have been used in the past, the coating consists of thermosetting resins using a bifunctional hardener and wet chemistry process that produce a resin-coated proppant particulate with a coating of about 10 micrometers (μm), and does not exhibit the reduced density characteristics of the high-flow polyolefin coated mineral proppant particulates of the present disclosure. Advantageously, the high-flow polyolefin coated mineral proppant particulates of the present disclosure may be produced using a one-pot hot melt process, in which the high-flow polyolefin melts and flows in a controlled manner with the application of heat allowing thermoforming of the proppant particulates.

Illustrative high-flow polyolefin coated mineral proppant particulates of the present disclosure may have, among other characteristics, a particle density of equal to or less than 1.35 grams per cubic centimeter (g/cc) (traditional sand proppant particulates have a comparable particle density on the lower end at about 2.6 g/cc, with ceramic proppant having an even higher particle density), and are suitable for inclusion in a carrier fluid for hydraulic fracturing operations within a horizontal, vertical, or tortuous wellbore, including hydrocarbon-bearing production wellbores and water-bearing production wellbores.

Definitions and Test Methods

As used herein, the term "proppant particulate," and grammatical variants thereof, refers to a solid material capable of maintaining open an induced fracture during and following a hydraulic fracturing treatment. The term "proppant pack," and grammatical variants thereof, refers to a collection of proppant particulates.

As used herein, the term "fracturing fluid" refers to a chemical mixture comprising a flowable carrier fluid, proppant particulates, and one or more optional additives.

As used herein, the term "particle density," with reference to the density of proppant particulates, refers to the density of the individual particulates themselves, which may be expressed in grams per cubic centimeter (g/cm$^3$). The particle density values of the present disclosure are based on the American Petroleum Institute's Recommended Practice 19C (hereinafter "API RP-19C") standard entitled "Measurement of Properties of Proppants Used in Hydraulic Fracturing and Gravel-packing Operations" (First Ed. May 2008, Reaffirmed June 2016). Particle density is also referred to as specific gravity in the industry.

As used herein. D50 is primarily used to describe particle sizes. As used herein, the term "D50" refers to a diameter at which 50% of the sample (on a volume basis unless otherwise specified) is comprised of particles having a diameter less than said diameter value. Particle size can be determined by sieve analysis, light scattering techniques or analysis of optical digital micrographs. Unless otherwise specified, sieve analysis are used for analyzing particle size.

As used herein, the term "crush strength" or "compressive strength," and grammatical variants thereof, with reference to proppant particulates, refers to the stress (compressive) load proppant particulates can withstand prior to crushing (e.g., breaking or cracking). The crush strength values of the present disclosure are based on API RP-19C.

As used herein, the term "melt index," and grammatical variants thereof, refers to a measure for the ease of flow of melted polymers, and is expressed in grams per min (g/min). The melt index values of the present disclosure are based on the ASTM International D1238-20 standard entitled "Standard Test Method for Melt Flow Rates of Thermoplastics by Extrusion Plastometer" (First Ed., 2001) or the International Standards Organization standard 1133 (First Ed. February 2012).

As used herein, the term "high-flow polyolefin," and grammatical variants thereof, refers to a polyolefin having a melt index (2.16 Kg) of equal to or greater than about 1 g/10 min, such as in the range of 1 g/10 min to 50 g/10 min, or 25 g/10 min to 50 g/10 min, encompassing any value and subset therebetween.

As used herein, the term "coat," and grammatical variants thereof, with reference to the high-flow polyolefin coated mineral proppant particulates of the present disclosure, refers to complete or partial coating about a mineral proppant particulate, encompassing surface coating of the mineral proppant particulates (e.g., dispersion coating), embedment coating within pores of the mineral proppant particulates, and any combination thereof (e.g., embedment and surface coating). That is, the coating needn't cover the entirety of the surface of the mineral proppant particulate. The extent of coating results in a high-flow polyolefin coated mineral proppant particulate having a particle density of equal to or less than 1.35 g/cc.

As used herein, the term "carrier fluid," and grammatical variants thereof, refers to a fluid used to transport proppant particulates into a wellbore and fracture therein, which may include various additives, without departing from the scope of the present disclosure, and as would be apparent by one of ordinary skill in the art in light of the present disclosure.

As used herein, the term "fracture conductivity" refers to the permeability of a proppant pack to conduct fluid at various stress (pressure) levels. The fracture conductivity values of the present disclosure are based on the American Petroleum Institute's Recommended Practice 19D (API RP-19D) standard entitled "Measuring the Long-Term Conductivity of Proppants" (First Ed. May 2008, Reaffirmed May 2015).

All numerical values within the detailed description and the claims herein are modified by "about" or "approximately" with respect to the indicated value, and take into account experimental error and variations that would be expected by a person having ordinary skill in the art.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

High-Flow Polyolefin Coated Mineral Proppant Particulates, Methods and Systems

Hydraulic fracturing operations require effective proppant particulates to maintain the permeability and conductivity of a production well, such as for effective hydrocarbon recovery. Effective proppant particulates are typically associated with a variety of particular characteristics or properties, including efficient proppant particulate transport within a carrier fluid, sufficient compressive strength to maintain fractures propped upon the removal of hydraulic pressure, and efficient conductivity once the wellbore is brought on production.

The rate of settling of a proppant particulate within a fracturing fluid at least in part determines its transport capacity within one or more fractures created during a hydraulic fracturing operation. The rate of settling of a proppant particulate may be determined using Equation 1:

$$v = \frac{\rho_p - \rho_f}{18\eta} g\sigma^2, \quad \text{Equation 1}$$

where v is the terminal settling velocity of the proppant particle; $\rho_p - \rho_f$ is proportional to the density difference between the proppant particle and the carrier fluid; $\eta$ is the viscosity of the carrier fluid; g is the gravitational constant; and $\sigma^2$ is proportional to the square of the proppant particulate size. As will be appreciated, proppant particulates having lower particle densities and/or smaller average particle sizes settle at a slower rate within an identical carrier fluid (thus having better transport) compared to higher particle density and/or larger average particle-sized proppant particulates.

A proppant particulate's crush strength is a measure of its ability to withstand compressive stresses within a fracture, as they must resist sustained loads within a fractured subterranean formation during the lifetime of a wellbore to maintain its conductivity. Proppant particulates that are not able to withstand the imposed stresses of a fracture will crush over time, resulting in the formation of fines that may be transported into the wellbore and through equipment with produced fluids and accumulate in sufficient quantities to decrease production rates and/or necessitate costly wellbore cleanout operations or equipment replacement. Accordingly, proppant particulates with higher crush strengths are favorable. Such higher strength proppant particulates would additionally serve to promote fracture conductivity, particularly under increasing stresses. According to API RP-19C standards, adequate proppant particulates should have a crush strength in which less than 10% of fines are produced under a stress of 5.000 psi. As provided herein, adequate proppant particulates are evaluated against a minimum standard of 10 millidarcy-foot (mD-ft) to 30 mD-ft hydraulic conductivity under a stress of 8000 psi.

Proppant particulate efficacy is further related to fracture conductivity, characterized by the fluid flow rate in a propped fracture under gradient pressure, the fracture being propped by a proppant pack. Fracture conductivity, $C_f$, is the product of the proppant pack permeability, k, and its thickness, h, and may be determined using Equations 2 and 3:

$$C_f = kh, \quad \text{Equation 2}$$

$$k = \frac{1}{C} \frac{\phi^3}{(1-\phi)^2} \sigma_{eff}^2 \Phi_s^2, \quad \text{Equation 3}$$

where C is a constant; $\phi$ is the proppant pack void fraction; $\sigma$ is the average particle-sized diameter of the proppant particulates; and $\Phi$ is a shape factor related to the asphericity of the proppant particulates. In tension with settling rate and transport, fracture conductivity favors proppant particulates having larger average particle-sized diameters, as well as thick proppant packs and narrow particle size distribution.

Accordingly, the conductivity of a proppant pack is dependent at least in part on the shape of the proppant particulates. In particular, proppant particulates having a substantially consistent spherical shape may provide increased porosity through which produced fluids may flow while maintaining the fracture(s) in a propped state. Moreover, proppant particulates having a relatively narrow size distribution may additionally be preferred to maintain the integrity of the proppant pack, such that smaller (or irregular shaped) proppant particulates do not fill voids within the proppant pack.

The Krumbein Chart provides an analytical tool to standardize visual assessment of the sphericity and roundness of proppant particulates. Each of sphericity and roundness is visually assessed on a scale of 0 to 1, with higher values of sphericity corresponding to a more spherical particle and higher values of roundness corresponding to less angular contours on a particle's surface. According to API RP-19C standards, the shape of a proppant particulate is considered adequate for use in fracturing operations if the Krumbein value for both sphericity and roundness is ≥0.6.

The high-flow polyolefin coated mineral proppant particulates having the characteristics described herein exhibit the aforementioned properties, as well as others, which make them not only a viable alternative for traditional proppant particulates, but further a surprising substitute with enhanced functionality.

The high-flow polyolefin coated mineral proppant particulates described herein are composed of an inner mineral particle coated with a high-flow polyolefin. The mineral is not considered to be particularly limiting and lower cost, traditional proppant particulate minerals may be used as the high-flow polyolefin coating is capable of advantageously reducing their density. Suitable mineral proppant particulates may include, but are not limited to, sand, silica, ceramic, carbon, and any combination thereof.

Generally, the mineral proppant particulates (uncoated) have an average diameter (D50) in the range of 100 μm to 3 millimeters (mm), or 100 μm to 2 mm, or 100 μm to 1 mm, or 100 μm to 500 μm, or 100 μm to 250 μm, encompassing any value and subset therebetween. In one or more aspects, the mineral proppant particulates (uncoated) have an average sieve distribution (diameter) of 30/50 mesh, or 40/70 mesh, or 70/140 mesh. In some aspects, a smaller mineral proppant particulate (e.g., 100 μm to 500 μm, or 40/70 mesh, or 100 mesh) average diameter may be desirable in order to apply a thicker high-flow polyolefin coating and achieve a greater density decrease for the high-flow polyolefin coated mineral proppant particulates.

The mineral proppant particulates described herein may have a relatively high particle density, upwards of 2 g/cc, such as in the range of 2 g/cc to 4 g/cc, encompassing any value and subset therebetween. Unexpectedly, when coated with a high-flow polyolefin, their particle density can be significantly lowered without compromising crush strength, thereby permitting the use of readily available, low cost proppant materials with enhanced functionality.

The high-flow polyolefin for coating the mineral proppant particulates may include, but are not limited to, a thermoplastic polyolefin, a polyolefin homopolymer, a polyolefin copolymer, a functionalized polyolefin (e.g., ExxonMobil ESCOR™ product series), a crosslinked polyolefin, and the like, and any combination thereof. Suitable specific examples of high-flow polyolefins for coating onto the mineral proppant particulates to form the high-flow polyolefin coated mineral proppant particulates of the present disclosure include, but are not limited to, a polyethylene (PE) (density of 0.92-0.94 g/cc), a high-density polyethylene (HDPE) (particle density of 0.92-0.97 g/cc), polypropylene (PP) (density of 0.88-0.92 g/cc), an HDPE/PP blend (i.e., a 1:99 to 99:1 ratio, encompassing any value and subset therebetween), a PE/PP copolymer, and the like, and any combination thereof. Accordingly, in some aspects, the high-flow polyolefin has a density in the range of 0.88 to 0.97, encompassing any value and subset therebetween.

It is to be appreciated that the high-flow polyolefin may be pure or otherwise obtained from a thermoplastic waste stream comprising polyolefins, provided that the available polyolefins meet the specification qualities described herein. Such waste streams may include, but are not limited to, industrial waste, consumer waste, and the like, and any combination thereof.

In some aspects, the high-flow polyolefin may be crosslinked with a crosslinker or a crosslinker otherwise added to the pores of a mineral proppant particulate to crosslink the high-flow polyolefin. The crosslinker may assist in decreasing the density of the resultant high-flow polyolefin coated mineral proppant particulates, such as by 0.1 to 0.2 units or more. Additionally, crosslinking may increase the heat resistance and mechanical strength/stiffness of the high-flow polyolefin coated mineral proppant particulates, and may further aid in bonding the high-flow polyolefin to the mineral particle.

Crosslinkers may include, but are not limited to, a silane, a peroxide, sulfur, a sulfur-containing compound, and the like, and any combination thereof. The crosslinkers may be included (mixed or otherwise initially blended) in an amount in the range of 0.01 weight % (wt %) to 5 wt % of the high-flow polyolefin (excluding any other additives), encompassing any value and subset therebetween.

In various aspects, the high-flow polyolefin may be blended with one or more antioxidants, such as a primary antioxidant and a secondary antioxidant, to protect the coating from degradation in an oxygen environment. Suitable antioxidants may include, but are not limited to, phenolic antioxidants (e.g., IRGANOX® 1010 and IRGANOX® 1076, available from BASF (Ludwigshafen, Germany)), secondary antioxidants (e.g., phosphites including, but not limited to, Tris(nonylphenyl) phosphite and IRGAFOS® 168, available from BASF), and the like, and any combination thereof. The total antioxidants may be included (mixed or otherwise initially blended) in an amount in the range of 0.01 weight % (wt %) to 1 wt % of the high-flow polyolefin (excluding any other additives), encompassing any value and subset therebetween.

In some aspects, the high-flow polyolefin may be blended with one or more foaming agents to further influence the density of the resultant high-flow polyolefin coated mineral proppant particulates of the present disclosure. Suitable foaming agents may include, but are not limited to endothermic chemical foaming agents (CFAs) (e.g., sodium bicarbonate), exothermic CFAs (e.g., sulfonyl hydrazides, pure and modified azodicarbonamides, semicarbazides, tetrazoles, and dihydroox-adiazinones), and the like, and any combination thereof. The foaming agent may be included (mixed or otherwise initially blended) in an amount in the range of 0.1 weight % (wt %) to 5 wt % of the high-flow polyolefin (excluding any other additives), encompassing any value and subset therebetween.

The density and/or compressive strength of the high-flow polyolefin coated mineral proppant particulates may additionally be influences by mixing one or more fillers with the high-flow polyolefin. Suitable fillers may include, but are not limited to, stearate, carbon, talc, sand, silica, calcium carbonate, and any combination thereof.

The particular weight ratio of high-flow polyolefin coating to mineral proppant particulates is not considered to be particularly limiting, provided that the density and strength/conductivity qualities described herein are met. In some aspects, the weight ratio of high-flow polyolefin coating (including any additives) to mineral proppant particulates is 0.5 wt % to about 80 wt %, or 10 wt % to 80 wt %, or 20 wt % to 50 wt %, encompassing any value and subset therebetween. For example, lower ratios may encompass surface coating of the mineral proppant particulates, whereas higher ratios may encompass embedment coating of the mineral proppant particulates.

In one or more aspects of the present disclosure, the surface coating thickness of the high-flow polyolefin coating upon the mineral proppant particulates may be in the range of about 30 µm to about 120 µm, as measured at the thickest coating location, encompassing any value and subset therebetween, so as to achieve a density of equal to or less than 1.35 g/cc. The particular thickness may depend on a number of factors including, but not limited to, the composition of the mineral proppant particulate, the composition of the high-flow polyolefin (and any additives), the desired density, the desired crush strength, the composition of the subterranean formation, and the like, and any combination thereof. The thickness should be selected such that the average diameter of the high-flow polyolefin coated mineral proppant particulates meet the average diameter range described above for the uncoated mineral proppant particulates.

For example, a 50 µm thick polyethylene coating of a 150 µm (100 mesh) sand particle is expected to create a 250 µm (60 mesh) proppant particulate that has a density of 1.3 g/cc. In this example, the polyethylene-to-sand ration is 3.63 by volume and 1.27 by weight.

The high-flow polyolefin coated mineral proppant particulates are prepared such that their particle density is equal to or less than 1.35 g/cc. In some aspects, the particle density of the high-flow polyolefin coated mineral proppant particulates is in the range of 0.95 g/cc to 1.35 g/cc, or 1.0 g/cc to 1.3 g/cc, encompassing any value and subset therebetween.

The high-flow polyolefin coated mineral proppant particulates may be substantially spherical and round in shape. Accordingly, in one or all aspects of the present disclosure, the sphericity of the high-flow polyolefin coated mineral proppant particulates are in the range of 0.6 to 1.0, encompassing any value and subset therebetween. The sphericity of the high-flow polyolefin coated mineral proppant particulates of the present disclosure are in the range of 0.6 to 1.0, encompassing any value and subset therebetween.

The present disclosure provides methods of preparing the high-flow polyolefin coated mineral proppant particulates described herein. In one or more aspects, the high-flow polyolefin coated mineral proppant particulates may be prepared in a one-pot hot melt process. The one-pot hot melt process (single reactor) may improve the efficiency of the coating process, allowing the polyolefin to melt and flow and further produce long-chain branched polyolefin. The reaction further does not require a stabilizer. Further, when a crosslinker is included, the high-flow polyolefin may optionally be activated during the one-pot hot melt process in the presence of heat or thereafter in the presence of either heat, moisture, or a combination thereof. Alternatively, one or more crosslinkers may be included in or with the high-flow polyolefin coated mineral proppant particulates without activation, such that crosslinking is not formed at the end of the coating process, but rather activated in a later step by applying heat, moisture, or a combination thereof. Alternatively or in addition, crosslinking activation may take place in situ during a fracturing process.

Accordingly, unlike traditional proppant particulates that are coated with thermosetting resins, which requires a bifunctional hardener and a wet chemistry process, the lightweight high-flow polyolefin coated mineral proppant particulates of the present disclosure may be produced by coating mineral particles in a one-step hot melt process using polyolefin thermoplastics, thereby allowing the polyolefin to melt and flow with proper application of heat. Thermoset resins, on the other hand, can char or decompose with heat, offering no route to thermoforming composite particles.

The high-flow polyolefin coated mineral proppant particulates described herein may be used as part of a fracturing fluid for use in a hydraulic fracturing operation, the fracturing fluid comprising a flowable (e.g., liquid or gelled) carrier fluid and one or more optional additives, including sand proppant. This fracturing fluid can be formulated at the well site in a mixing process that is conducted while it is being pumped. When the fracturing fluid is formulated at the well site, high-flow polyolefin coated mineral proppant particulates can be added in a manner similar to the known methods for adding traditional proppant particulates (e.g., sand) into the fracturing fluid, as described in greater detail below.

The carrier fluid of the present disclosure may comprise an aqueous-based fluid or a nonaqueous-based fluid. Aqueous-based fluids may include, but are not limited to, fresh water, saltwater (including seawater), treated water (e.g., treated production water), other forms of aqueous fluid, and any combination thereof. Nonaqueous-based fluids may include, for example, supercritical carbon-dioxide, liquid nitrogen, oil-based fluids (e.g., hydrocarbon, olefin, mineral oil, fatty acid), alcohol-based fluids, and any combination thereof.

One aqueous-based fluid class referred to as slickwater can be used with the low-density high-flow polyolefin coated mineral proppant particulates of the present disclosure. Slickwater aqueous-based fluids have a relatively low viscosity of generally less than 100 centipoise (cP), or in the range of 3 cP to 100 cP, encompassing any value and subset therebetween, and have low densities in the range of 1.0 g/cc to 1.5 g/cc, or 1.0 g/cc to 1.2 g/cc, encompassing any value and subset therebetween. As such, and unlike traditional high-density proppant particulates, the high-flow polyolefin coated mineral proppant particulates suspended in a slickwater carrier fluid, whether additional additives are included or not, can be pumped at high flow rates, and thus at high turbulence, to facilitate fracturing while maintaining the high-flow polyolefin coated mineral proppant particulates in suspension.

In various aspects, the viscosity and density of the carrier fluid may be altered by foaming or gelling. Foaming may be achieved using, for example, air or other gases (e.g., $CO_2$, $N_2$), alone or in combination. Gelling may be achieved using, for example, guar gum (e.g., hydroxypropyl guar), cellulose, or other gelling agents, which may or may not be crosslinked using one or more crosslinkers, such as polyvalent metal ions or borate anions, among other suitable crosslinkers. It is to be noted, however, that because the high-flow polyolefin coated mineral proppant particulates of the present disclosure exhibit particularly low density, the carrier fluid can be void of foaming or gelling agents or may otherwise comprise a reduced amount of foaming or gelling agents compared to a carrier fluid comprising traditional proppant particulates.

In addition, the carrier fluids may comprise one or more additives such as, for example, dilute aids, biocides, breakers, corrosion inhibitors, crosslinkers, friction reducers (e.g., polyacrylamides), gels, salts (e.g., KCl), oxygen scavengers. pH control additives, scale inhibitors, surfactants, weighting agents, inert solids, fluid loss control agents, emulsifiers, emulsion thinners, emulsion thickeners, viscosifying agents, particles, lost circulation materials, foaming agents, buffers, stabilizers, chelating agents, mutual solvents, oxidizers, reducers, clay stabilizing agents, and any combination thereof.

The methods described herein include preparation of fracturing fluid, which is not considered to be particularly limited, because the high-flow polyolefin coated mineral proppant particulates are capable of transportation in dry form or as part of a wet slurry from a manufacturing site (e.g., a refinery or synthetic fuel plant). Dry and wet forms may be transported via truck or rail, and wet forms may further be transported via pipelines. The transported dry or wet form of the high-flow polyolefin coated mineral proppant particulates may be added to a carrier fluid, including optional additives, at a production site, either directly into a wellbore or by pre-mixing in a hopper or other mixing equipment. In some aspects, for example, when the entirety of the proppant particulates within the fracturing fluid at a given time are high-flow polyolefin coated mineral proppant particulates, slugs of the dry or wet form may be added directly to the fracturing fluid (e.g., as it is introduced into the wellbore). These slugs of only high-flow polyolefin coated mineral proppant particulates may be followed by subsequent slugs of, again, only high-flow polyolefin coated mineral proppant particulates or of a mixture of high-flow polyolefin coated mineral proppant particulates and other traditional proppant particulates. In other aspects, such as when other traditional proppant particulate types are combined with the high-flow polyolefin coated mineral proppant particulates, a portion or all of the fracturing fluid may be pre-mixed at the production site or each proppant type may be added directly to the fracturing fluid separately or simultaneously. Any other suitable mixing or adding of the high-flow polyolefin coated mineral proppant particulates to produce a desired fracturing fluid composition may also be used, without departing from the scope of the present disclosure.

The methods of hydraulic fracturing suitable for use in one or more aspects of the present disclosure involve pumping fracturing fluid comprising high-flow polyolefin coated mineral proppant particulates at a high pump rate into a subterranean formation to form at least a primary fracture, as well as potentially one or more secondary fractures extending from the primary fracture, one or more tertiary fractures extending from the secondary fractures, and the like (all collectively referred to as a "fracture"). In an embodiment, this process is conducted one stage at a time along a horizontal well. The stage is hydraulically isolated from any other stages which have been previously fractured. In one embodiment, the stage being fractured has clusters of perf holes (e.g., perforations in the wellbore and/or subterranean formation) allowing flow of hydraulic fracturing fluid through a metal tubular casing of the horizontal well into the formation. Such metal tubular casings are installed as part of the completions when the well is drilled and serve to provide mechanical integrity for the horizontal wellbore. In some aspects, the pump rate for use during hydraulic fracturing may be at least about 20 barrels per minute (bbl/min), or at least about 30 bbl/min, and more in excess of about 50 bbl/min and less than 200 bbl/min at one or more time durations during the fracturing operation (e.g., the rate may be constant, steadily increased, or pulsed), encompassing any value and subset therebetween. These high rates may, in some aspects, be utilized after about 10% of the entire volume of fracturing fluid to be pumped into the formation has been injected. That is, at the early periods of a hydraulic fracturing operation, the pump rate may be lower and as fracture(s) begin to form, the pump rate may be increased. Generally, the average pump rate of the fracturing fluid throughout the operation may be about 10 bbl/min, or about 15 bbl/min, or about 25 bbl/min. Typically, the pump rate during a fracturing operation may be, at any one time, in the range of about 20 bbl/min to about 150 bbl/min, or about 40 bbl/min to about 120 bbl/min, or about 40 bbl/min to about 100 bbl/min, encompassing any value and subset therebetween.

In various aspects, the methods of hydraulic fracturing described herein may be performed wherein the concentration of the proppant particulates (including high-flow polyolefin coated mineral proppant particulates and any other traditional proppant particulates) within the injected fracturing fluid is altered (i.e., on-the-fly while the fracturing operation is being performed, such that hydraulic pressure is maintained within the formation and fracture(s)). For example, in some aspects, the initially injected fracturing fluid may be injected at a low pump rate and may comprise proppant particulates in an amount of 0 volume % (vol %) to about 1 vol % of the fracturing fluid. As one or more fractures begin to form and grow, the pump rate is increased and the concentration of proppant particulates may be increased in a stepwise fashion (with or without a stepwise increase in pump rate) with a maximum concentration of proppant particulates reaching about 2.5 vol % to about 20 vol % of the fracturing fluid, encompassing any value and subset therebetween, which may be solely high-flow polyolefin coated mineral proppant particulates. For example, the maximum concentration of proppant particulates may reach at least 2.5 vol %, or at least about 8 vol %, or at least about 16 vol % of the fracturing fluid. In some aspects, all of the proppant particulates are high-flow polyolefin coated mineral proppant particulates. In other aspects, at one or more time periods during the hydraulic fracturing operation, at least about 2 vol % to about 100 vol % of any proppant particulates suspended within the fracturing fluid are high-flow polyolefin coated mineral proppant particulates, such as at least about 2 vol %, or at least about 15 vol %, or at least about 25 vol %, or 100 vol %, or in the range of about 20 vol % to about 50 vol %, encompassing any value and subset therebetween. Moreover, when combined the average diameters of any proppant particulates may be the same or different, without departing from the scope of the present disclosure.

In one or more aspects, the high-flow polyolefin coated mineral proppant particulates may be introduced in the mix after about ⅛ to about ¾ of the total volume of fracturing fluid has been injected within a formation. Because of the low density of the high-flow polyolefin coated mineral proppant particulates, it may be beneficial to introduce the high-flow polyolefin coated mineral proppant particulates during later time periods of fracturing after which the fracture(s) have already grown substantially, such that the high-flow polyolefin coated mineral proppant particulates can travel within the fracturing fluid to remote locations of the formed fracture(s). Denser proppant particulates (e.g., sand) would not be able to reach these remote locations due to settling effects, for example.

The hydraulic fracturing methods described herein may be performed in drilled horizontal, vertical, or tortuous wellbores, hydrocarbon-producing (e.g., oil and/or gas) wellbores and water-producing wellbores. These wellbores may be in various subterranean formation types including, but not limited to, shale formations, oil sands, gas sands, and the like.

The wellbores are typically completed using a metal (e.g., steel) tubular or casing that is cemented into the subterranean formation. To contact the formation, a plurality of perforations are created through the tubular and cement along a section to be treated, usually referred to as a plug and perforated ("plug and perf") cased-hole completion. Alternative completion techniques may be used without departing from the scope of the present disclosure, but in each technique, a finite length of the wellbore is exposed for hydraulic fracturing and injection of fracturing fluid. This finite section is referred to herein as a "stage." In plug and perf completions, the stage length may be based on a distance over which the tubular and cement has been perforated, and may be in the range of about 10 feet (ft) to about 2,000 ft, for example, and more generally in the range of about 100 ft to about 300 ft, encompassing any value and subset therebetween. The stage is isolated (e.g., sliding sleeve, ball) such that pressurized fracturing fluid from the surface can flow through the perforations and into the formation to generate one or more fractures in only the stage area. Clusters of perforations may be used to facilitate initiation of multiple fractures. For example, clusters of perforations may be made in sections of the stage that are about 1 ft to about 3 ft in length, and spaced apart by about 2 ft to about 30 ft, encompassing any value and subset therebetween.

For each linear foot of the stage, at least about 6 barrels (about 24 cubic feet ($ft^3$)), or at least about 24 barrels (about 135 $ft^3$), or at least 60 barrels (about 335 $ft^3$) and less than 6,000 barrels (about 33,500 $ft^3$) of fracturing fluid may be injected to grow the one or more fractures, encompassing any value and subset therebetween. In certain aspects, for each linear foot of the stage, at least about 1.6 $ft^3$, preferably about 6.4 $ft^3$, and more preferably at least 16 $ft^3$ and less than 160 $ft^3$ of proppant particulates may be injected to prop the fractures. In some aspects, to prevent bridging of the proppant particulates during injection into the fractures, the ratio of the volume of the proppant particulates to the liquid portion of the fracturing fluid, primarily the carrier fluid, is greater than 0 and less than about 0.25 and preferably less than about 0.15. If the volume ratio becomes too large a phenomena known as "sanding out" will occur.

Certain commercial operations, such as commercial shale fracturing operations, may be particularly suitable for hydraulic fracturing using the high-flow polyolefin coated mineral proppant particulates and methods described herein, as the mass of proppant particulates required per stage in such operations can be quite large and substantial economic benefit may be derived using the high-flow polyolefin coated mineral proppant particulates. Indeed, in some instances, a stage in a shale formation may be designed to require at least about 30,000, at least about 100,000, or at least about 250,000 pounds (mass) of proppant particulates, encompassing any value and subset therebetween. In such cases, economic and performance benefit may be optimized when at least about 5%, or at least about 25%, and up to 100% of the proppant particulate mass comprises high-flow polyolefin coated mineral proppant particulates.

Multiple stages of the wellbore are isolated and hydraulic fracturing performed at each stage. The high-flow polyolefin coated mineral proppant particulates of the present disclosure may be used in any one, more, or all stages, including at least 2 stages, at least 10 stages, or at least 20 stages.

EXAMPLE EMBODIMENTS

Nonlimiting example embodiments of the present disclosure include:

Embodiment A: A proppant particulate comprising: a mineral particle; and a high-flow polyolefin coating at least a portion of the mineral particle, wherein the proppant particulate has a particle density of equal to or less than about 1.35 grams per cubic centimeter.

Embodiment B: A fracturing fluid comprising: a carrier fluid; and proppant particulates comprising a mineral particle and a high-flow polyolefin coating at least a portion of the mineral particle, wherein the proppant particulates have a particle density of equal to or less than about 1.35 grams per cubic centimeter.

Embodiment C: A method comprising: introducing a fracturing fluid into a subterranean formation, the fracturing fluid comprising: a carrier fluid; and proppant particulates comprising a mineral particle and a high-flow polyolefin coating at least a portion of the mineral particle, wherein the proppant particulates have a particle density of equal to or less than about 1.35 grams per cubic centimeter.

Embodiment D: A method comprising: mixing, in a one-pot hot melt process, mineral particles and a high-flow polyolefin having a particle density in the range of about 0.88 grams per cubic centimeter to about 0.97 grams per cubic centimeter, thereby coating at least a portion of the mineral particles with the high-flow polyolefin.

Nonlimiting example Embodiments A, B, C, and D may include one or more of the following elements:

Element 1: Wherein the high-flow polyolefin coating is a surface coating of at least a portion of the mineral particle, an embedment coating within pores of the mineral particles, and any combination thereof.

Element 2: Wherein the high-flow polyolefin coating is a surface coating having a thickness about in the range of about 30 μm to about 120 μm.

Element 3: Wherein the particle density is in the range of about 0.95 g/cc to about 1.35 g/cc.

Element 4: Wherein the mineral particle is sand, ceramic, and any combination thereof.

Element 5: Wherein the high-flow polyolefin coating is a thermoplastic polyolefin, a polyolefin homopolymer, a polyolefin copolymer, a functionalized polyolefin, a crosslinked polyolefin, and the like, and any combination thereof.

Element 6: Wherein the high-flow polyolefin coating is a polyethylene, a high-density polyethylene, polypropylene, a high-density polyethylene and polypropylene blend, a polyethylene and polypropylene copolymer, and the like, and any combination thereof.

Element 7: Wherein the high-flow polyolefin coating has a particle density in the range of about 0.88 grams per cubic centimeter to about 0.97 grams per cubic centimeter.

Element 8: Wherein the high-flow polyolefin coating has a melt index in the range of 1 grams per 10 minutes to 50 grams per 10 minutes.

Element 9: Wherein the high-flow polyolefin coating further comprises a crosslinker, an antioxidant, a filler, a foaming agent, and any combination thereof.

Element 10: Wherein the proppant particulate has an average diameter in the range of about 100 micrometers to about 3 millimeters.

Element 11: Wherein the ratio of high-flow polyolefin coating to mineral particle is in the range of about 0.5 weight % to 80 weight %.

Element 12: Wherein the proppant particulate has a Krumbein sphericity of ≥0.6.

Element 13: Wherein the high-flow polyolefin coating is obtained from a polyolefin-containing waste stream.

Embodiments A, B, C, or D may be in any combination with one, more, or all of Elements 1 through 13, including 1 and 2, 1 and 3, 1 and 4, 1 and 5, 1 and 6, 1 and 7, 1 and 8, 1 and 9, 1 and 10, 1 and 11, 1 and 12, 1 and 13, 2 and 3, 2 and 4, 2 and 5, 2 and 6, 2 and 7, 2 and 8, 2 and 9, 2 and 10, 2 and 11, 2 and 12, 2 and 13, 3 and 4, 3 and 5, 3 and 6, 3 and 7, 3 and 8, 3 and 9, 3 and 10, 3 and 11, 3 and 12, 3 and 13, 4 and 5, 4 and 6, 5 and 6, 5 and 7, 5 and 8, 5 and 9, 5 and 10, 5 and 11, 5 and 12, 5 and 13, 6 and 7, 6 and 8, 6 and 9, 6 and 10, 6 and 11, 6 and 12, 6 and 13, 7 and 8, 7 and 9, 7 and 10, 7 and 11, 7 and 12, 7 and 13, 8 and 9, 8 and 10, 8 and 11, 8 and 12, 8 and 13, 9 and 10, 9 and 11, 9 and 12, 9 and 13, 10 and 11, 10 and 12, 10 and 13, 11 and 12, 11 and 13, 12 and 13 and any other nonlimiting combinations or 1 through 13.

Nonlimiting example Embodiment B may include one or more of the following elements:

Element 14: Wherein the carrier fluid is an aqueous carrier fluid.

Element 15: Further comprising second proppant particulates composed of a material that is not a high-flow polyolefin coated mineral material.

Embodiments B may be in any combination with one, more, or all of Elements 1 through 13 above including one or both of Element 14 and/or Element 15, without limitation.

Nonlimiting example Embodiment C may include one or more of the following elements:

Element 16: Further comprising depositing at least a portion of the proppant particulates within one or more fractures in the subterranean formation.

Element 17: Wherein the fracturing fluid further comprises second proppant particulates composed of a material that is not a high-flow polyolefin coated mineral material.

Embodiments C may be in any combination with one, more, or all of Elements 1 through 13 above including one or both of Element 16 and/or Element 17, without limitation.

Nonlimiting example Embodiment D may include one or more of the following elements:

Element 18: Wherein the high-flow polyolefin further comprises a crosslinker, and further activating the crosslinker in the presence of heat, moisture, and any combination thereof.

Element 19: Further comprising: mixing, in the one-pot hot melt process, the mineral particles and the high-flow polyolefin with a crosslinker, and further activating the crosslinker in the presence of heat, moisture, and any combination thereof.

Embodiments D may be in any combination with one, more, or all of Elements 1 through 13 above including one or both of Element 18 and/or Element 19, without limitation.

Unless otherwise indicated, all numbers expressing quantities of ingredients, properties such as molecular weight, reaction conditions, and so forth used in the present specification and associated claims are to be understood as being modified in all instances by the term "about," and take into account experimental error and variations that would be expected by a person having ordinary skill in the art. Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the aspects of the present disclosure, the following examples of preferred or representative aspects are given. In no way should the following examples be read to limit, or to define, the scope of the disclosure.

EXAMPLES

Example 1. In this example, 100 grams (g) of 150 μm (100 mesh) sand proppant particulates (density 2.65 g/cc) were added to a heating device with a stirrer. The sand was heated to 400° C. (752° F.) and thereafter 424 g of granular ExxonMobil LLDPE5100.09, a linear low-density polyethylene, was added. The mixture was stirred until the sand was visually evenly dispersed in the molten polyolefin, and then allowed to cool to room temperature (RT). The particle density was measured at 1.06 g/cc.

Example 2. In this example, 100 grams (g) of 150 μm (100 mesh) sand proppant particulates were added to a heating device with a stirrer. The sand was heated to 400° C. (752° F.) and thereafter 412 g of granular ExxonMobil ACHIEVE™ Advanced PP6936G2, a polypropylene homopolymer, was added. The mixture was stirred until the sand was visually evenly dispersed in the molten polyolefin, and then allowed to cool to RT. The particle density was measured at 1.03 g/cc.

Example 3. In this example, 100 grams (g) of 150 μm (100 mesh) sand proppant particulates were added to a heating device with a stirrer. The sand was heated to 350° C. (662° F.) and thereafter 435 g of ExxonMobil PAXON™ 7203, a high-density polyethylene comprising a crosslinker, was added. The mixture was stirred until the sand was visually evenly dispersed in the molten polyolefin, heated to 410° C. (770° F.) to activate the crosslinker, and then allowed to cool to RT. The particle density was measured at 1.08 g/cc.

Example 4. In this example, 100 grams (g) of 150 μm (100 mesh) sand proppant particulates were added to a heating device with a stirrer. The sand was heated to 350° C. (662° F.) and thereafter 435 g of granular ExxonMobil PAXON™ 7000, a crosslinkable high-density polyethylene, 0.5 wt % of organic peroxide (crosslinker), and 0.5 wt % of Triallyl isocyanurate (TAIC) (coagent) was added according to European Patent No. 0651001, the entirety of which is incorporated herein by reference. The blend was stirred until the sand was visually evenly dispersed in the molten polyolefin, heated to 400° C. (752° F.) to activate the crosslinker, and then allowed to cool to RT. The particle density was measured at 1.08 g/cc.

Example 5. In this example, 100 grams (g) of 150 μm (100 mesh) sand proppant particulates, 260 g of granular ExxonMobil PAXON™ 7000, a crosslinkable high-density polyethylene, 0.5 wt % of Tert-Butyl cumyl peroxide (BCUP) (crosslinker), and 0.5 wt % of TAIC (coagent) was blended according to European Patent No. 0651001, the entirety of which is incorporated herein by reference. After mixing, the blend was run through an extruder at 325° C. (617° F.) to produce micro-pellets having an average diameter (D50) of 354 μm (45 mesh), thereafter heated to 400° C. (752° F.) to activate the crosslinker, and then allowed to cool to RT. The particle density was measured at 1.16 g/cc.

Accordingly, the high-flow polyolefin coated mineral proppant particulates of the present disclosure are suitable for use in fracturing operations, including in unconventional formation types.

Many alterations, modifications, and variations will be apparent to those skilled in the art in light of the foregoing description without departing from the spirit or scope of the present disclosure and that when numerical lower limits and numerical upper limits are listed herein, ranges from any lower limit to any upper limit are contemplated.

Therefore, the present disclosure is well adapted to attain the ends and advantages mentioned as well as those that are inherent therein. The particular examples and configurations disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A proppant particulate comprising:
  a mineral particle;
  a high-flow polyolefin coating at least a portion of the mineral particle;
  wherein the proppant particulate, when coated, has a particle density of equal to or less than about 1.35 grams per cubic centimeter; and
  wherein the polyolefin coating is crosslinked with a crosslinker selected from a group consisting of a silane, a peroxide, sulfur, a sulfur-containing compound, and any combination thereof.

2. The proppant particulate of claim 1, wherein the high-flow polyolefin coating is a surface coating of at least a portion of the mineral particle, an embedment coating within pores of the mineral particles, or any combination thereof.

3. The proppant particulate of claim 1, wherein the high-flow polyolefin coating is a surface coating having a thickness about in the range of about 30 μm to about 120 μm.

4. The proppant particulate of claim 1, wherein the particle density of the proppant particulate is in the range of about 0.95 g/cc to about 1.35 g/cc.

5. The proppant particulate of claim 1, wherein the mineral particle is sand, ceramic, or any combination thereof.

6. The proppant particulate of claim 1, wherein the high-flow polyolefin coating is a thermoplastic polyolefin, a polyolefin homopolymer, a polyolefin copolymer, a functionalized polyolefin, or any combination thereof.

7. The proppant particulate of claim 1, wherein the high-flow polyolefin coating is a polyethylene, a high-density polyethylene, polypropylene, a high-density polyethylene and polypropylene blend, a polyethylene and polypropylene copolymer, or any combination thereof.

8. The proppant particulate of claim 1, wherein the high-flow polyolefin coating has a particle density in the range of about 0.88 grams per cubic centimeter to about 0.97 grams per cubic centimeter.

9. The proppant particulate of claim 1, wherein the high-flow polyolefin coating has a melt index in the range of 1 grams per 10 minutes to 50 grams per 10 minutes.

10. The proppant particulate of claim 1, wherein the high-flow polyolefin coating further comprises an antioxidant, a filler, a foaming agent, or any combination thereof.

11. The proppant particulate of claim 1, wherein the proppant particulate has an average diameter in the range of about 100 micrometers to about 3 millimeters.

12. The proppant particulate of claim 1, wherein the ratio of high-flow polyolefin coating to mineral particle is in the range of about 0.5 weight % to 80 weight %.

13. The proppant particulate of claim 1, wherein the proppant particulate has a Krumbein sphericity of ≥0.6.

14. The proppant particulate of claim 1, wherein the high-flow polyolefin coating is obtained from a polyolefin-containing waste stream.

15. The proppant particulate of claim 1, wherein the crosslinker is included in the polyolefin coating in an amount in the range of 0.01 weight % (wt %) to 5 wt %.

16. A fracturing fluid comprising:
a carrier fluid;
proppant particulates comprising a mineral particle, and a high-flow polyolefin coating at least a portion of the mineral particle,
wherein the proppant particulates, when coated, have a particle density of equal to or less than about 1.35 grams per cubic centimeter; and
wherein the polyolefin coating is crosslinked with a crosslinker selected from a group consisting of a silane, a peroxide, sulfur, a sulfur-containing compound, and any combination thereof.

17. The fracturing fluid of claim 16, wherein the carrier fluid is an aqueous carrier fluid.

18. The fracturing fluid of claim 16, further comprising second proppant particulates composed of a material that is not a high-flow polyolefin coated mineral material.

19. The fracturing fluid of claim 16, wherein the crosslinker is included in the polyolefin coating in an amount in the range of 0.01 weight % (wt %) to 5 wt %.

20. A method comprising:
introducing a fracturing fluid into a subterranean formation, the fracturing fluid comprising:
a carrier fluid;
proppant particulates comprising a mineral particle and a high-flow polyolefin coating at least a portion of the mineral particle,
wherein the proppant particulates have a particle density of equal to or less than about 1.35 grams per cubic centimeter; and
wherein the polyolefin coating is crosslinked with a crosslinker selected from a group consisting of a silane, a peroxide, sulfur, a sulfur-containing compound, and any combination thereof.

21. The method of claim 20, further comprising depositing at least a portion of the proppant particulates within one or more fractures in the subterranean formation.

22. The method of claim 20, wherein the fracturing fluid further comprises second proppant particulates composed of a material that is not a high-flow polyolefin coated mineral material.

23. The method of claim 20, wherein the crosslinker is included in the polyolefin coating in an amount in the range of 0.01 weight % (wt %) to 5 wt %.

* * * * *